T. J. W. ROBERTSON.

Feed Motion for Sewing Machines.

No. 343. Reissued Jan'y 15, 1856.

N. PETERS. Photo-Lithographer, Washington, D. C.

UNITED STATES PATENT OFFICE.

THOS. J. W. ROBERTSON, OF NEW YORK, N. Y., ASSIGNOR TO HIMSELF AND ALFRED E. BEACH.

IMPROVEMENT IN SEWING-MACHINES.

Specification forming part of Letters Patent No. 12,577, dated March 20, 1855; Reissue No. 343, dated January 15, 1856.

*To all whom it may concern:*

Be it known that I, THOMAS J. W. ROBERTSON, of the city, county, and State of New York, have invented a new and useful Improvement in the Feed-Motion of Sewing-Machines; and I do hereby declare that the following is a full, clear, and exact description of the same, reference being had to the accompanying drawings, forming part of this specification, in which—

Figure 1:
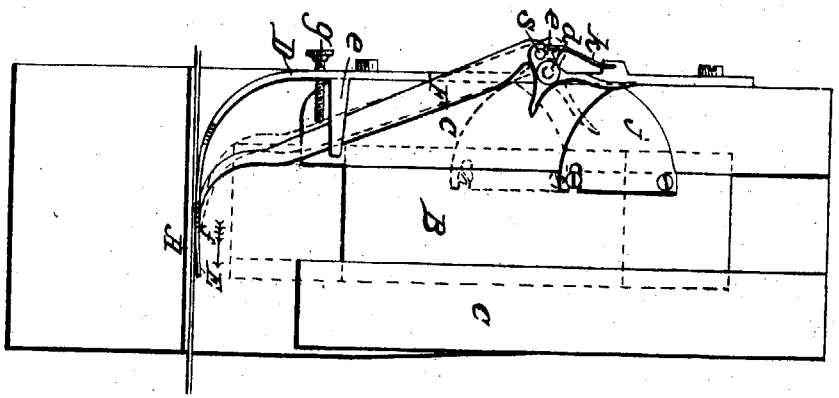
Figure 2:
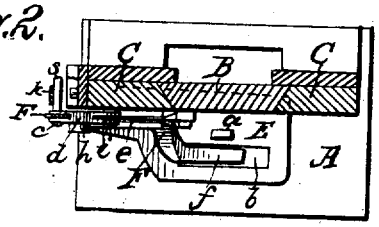

Figure 1 is a front view of a portion of a sewing-machine with my improved feed-motion applied. Fig. 2 is a plan of the same, and similar letters of reference indicate corresponding parts in both figures.

My improvement consists, first, in the arrangement of the feeding dog or finger, in connection with a spring presser-bar, and, secondly, in the manner of operating said feeding-finger. The improvement, in the first instance, consists in applying the feeding-finger and the spring-pressure pad (to keep the cloth in its position) both on one side or surface, and so that the cloth is held by a continuous pressure upon it, irrespective of the motion of the feed-finger, whereby the latter operates against the friction so produced. The cloth by this means is always firmly held in position, and therefore cannot easily become shifted from its proper course under the needle. The improvement in the second part lies in the method of working the feed-finger, whereby the required pressure, both for gripping the cloth and for thrusting it forward, is obtained by a single movement, and thus, in the ability to so adjust the pressure as to insure the feeding by friction, it is in close imitation of the action of the hand of an operator doing the like.

The construction and operation are as follows:

At A in the accompanying drawings is the cloth-table. B is the needle-slider, and C C the slide in which the said slider works. These parts are all arranged in the same way as the corresponding parts of many well-known sewing-machines.

D is a spring, of the form I propose generally to employ, to confine the cloth to the table. This spring consists of a curved bar of steel attached to the side of the slider C C, or other portion of the machine, and terminating with a broad shoe, E, to bear upon the material to be sewed all round the needle, the latter being intended to work through the opening *a*, (see Fig. 2,) made in the shoe for the purpose. Another hole, B, is also made in the shoe for the feeding-dog to work through. The blue line in Fig. 1 represents the material confined to the table by the spring.

At *f* is the feeding-dog, consisting of a piece of steel or other metal, having a serrated face, and being attached rigidly to or forming part of a light bar, F, which is suspended from the arm *c* of a three-armed lever whose fulcrum is a pin, *d*, which may be either secured in the upper part of the spring D, as represented, or in some other convenient fixed part of the machine. If the said bar is attached to the spring D, all the elasticity should be below the point of such attachment. The dog works through the opening *b* in the shoe E, which opening should be as near as possible to the needle. At about the middle of its length the bent bar F works within a forked guide, *e*, attached to the spring D, and near this guide an adjusting-screw, *g*, (see Fig. 1,) is fitted to the spring D (which should have sufficient substance and stiffness at that part for the purpose) to control the movement of the feed-bar away from the needle. When the dog is not in contact with the material on the cloth-bed, the feed-bar rests against the point of the screw *g*, as shown in red outline in Fig. 1, being brought to this position by its own weight. The other arms, *h* and *i*, of the three-armed lever, before mentioned, stand in such positions that the former will be pushed aside during the ascent of the needle and the latter during the descent of the needle by a wiper, *j*, attached to the needle-slider B. The effect of the latter movement is to raise the arm *c*, to which the feed-bar is attached, and that of the former is to depress the said arm.

I will now describe the feeding operation, first supposing the dog to be raised from the surface of the cloth and hanging against the screw *g*, as indicated in red outline in Fig. 1. I will now suppose the needle-slider and the wiper to be rising from the cloth, by which action the wiper *j* will push aside the arm *h* of the three-armed lever to the position in which it is shown in black outline, and in so doing will depress the arm *c*. The feed-bar F during the above operation will slide along the point of the screw *g* until the dog *f* bears upon the cloth, after which the dog will be caused to slide the cloth along the table in the direction of the arrow. When the needle-slider and wiper *j* descend, the wiper, in pushing aside the arm *i*, will raise the arm *c*, and as the dog is by that means withdrawn from contact with the cloth, the feed-bar will fall back to the screw *g*. This screw serves to regulate the length of stitch by controlling the backward movement of the dog; or the length of stitch may be varied by moving the wiper farther in or out to move the dog farther or not so far forward. In applying the feed-bar care must be taken to give it an angle deviating so far from a perpendicular to the cloth-table that it will be caused to press its teeth firmly into the surface of the cloth, but not sufficiently approaching the perpendicular to prevent the dog sliding easily. I consider an angle of about twenty degrees to be well adapted for the purpose. In order to prevent a reaction being produced on the dog by any elasticity of the cloth or material which is being sewed after the wiper *j* passes the arm *h* in its upward motion, I attach a spring, *k*, to the fixed part of the machine, so as to produce friction upon the pin S, by which the feed-bar is connected to the arm *c* of the three-armed lever, or by applying some equivalent device to produce sufficient friction on the said pin to prevent the dog being returned by such means.

I have only represented a single-toothed feeding-dog; but I propose to use two, united in the form of a fork, one working on one side and the other on the other side of the needle, which will work within the fork.

Most of the feed-motions now in common use, with a spring to hold or confine the material during the sewing operation, have the spring applied to hold the cloth to the surface of the feeding device; or the feeding apparatus is pressed down upon the cloth by a spring or other equivalent device; but it will be seen that my invention differs essentially therefrom in being used to confine the material to the table or bed on which it is sewed, and not at all to the feeding device, and that the spring and the feeding device act with perfect independence of each other.

In the ordinary feed-motions the dog is arranged under the table and acts against the spring or plate E. If there is any extra resistance to the feeding of the cloth, the spring or shoe is apt to give or rise, and consequently the dog will not act properly upon the cloth. By arranging the dog on the upper side of the cloth, so that it will act against a rigid plate or table, this defect is avoided, and the advantage of the yielding pressure of the spring E upon the cloth is retained. There is another advantage in arranging the feeding-dog on the upper side of the table—it gives room and opportunity for forming a forked dog, so that the needle may work between the forks of the dog, instead of on one side, as heretofore.

I do not claim in itself as new the arrangement of the feeding-dog and spring-clamp separately operating upon the cloth on its one or outside surface, as such has before been done by the alternate action of these devices. Neither do I claim of itself a separate and constant spring-pressure applied to the outside surface of the cloth when the feeding bar or dog is otherwise arranged to operate in connection with the spring clamp or hold, as specified; but I do claim as new and useful and desire to secure by Letters Patent—

1. The combination of the spring-clamp D with the feeding bar or dog *f*, constructed, arranged, and operating together against the cloth on its one side or surface, substantially as set forth.

2. The arrangement for effecting the feed—that is to say, setting the arm F of the feed-finger at such angle to the table that the diagonal direction of the thrust will cause the reciprocating motion imparted to the upper end to produce, in combination with the table, a lateral motion thereon of the feed-finger, as well as the requisite pressure for gripping and feeding the cloth, as set forth.

T. J. W. ROBERTSON.

Witnesses:
I. P. PINSSON,
S. H. MAYNARD.